June 7, 1960
L. F. GUENTERT ET AL
2,939,177
PROCESS OF CUTTING PARTIALLY COAGULATED
ESTERS OF CELLULOSE INTO SHORT LENGTHS
Filed Feb. 8, 1955
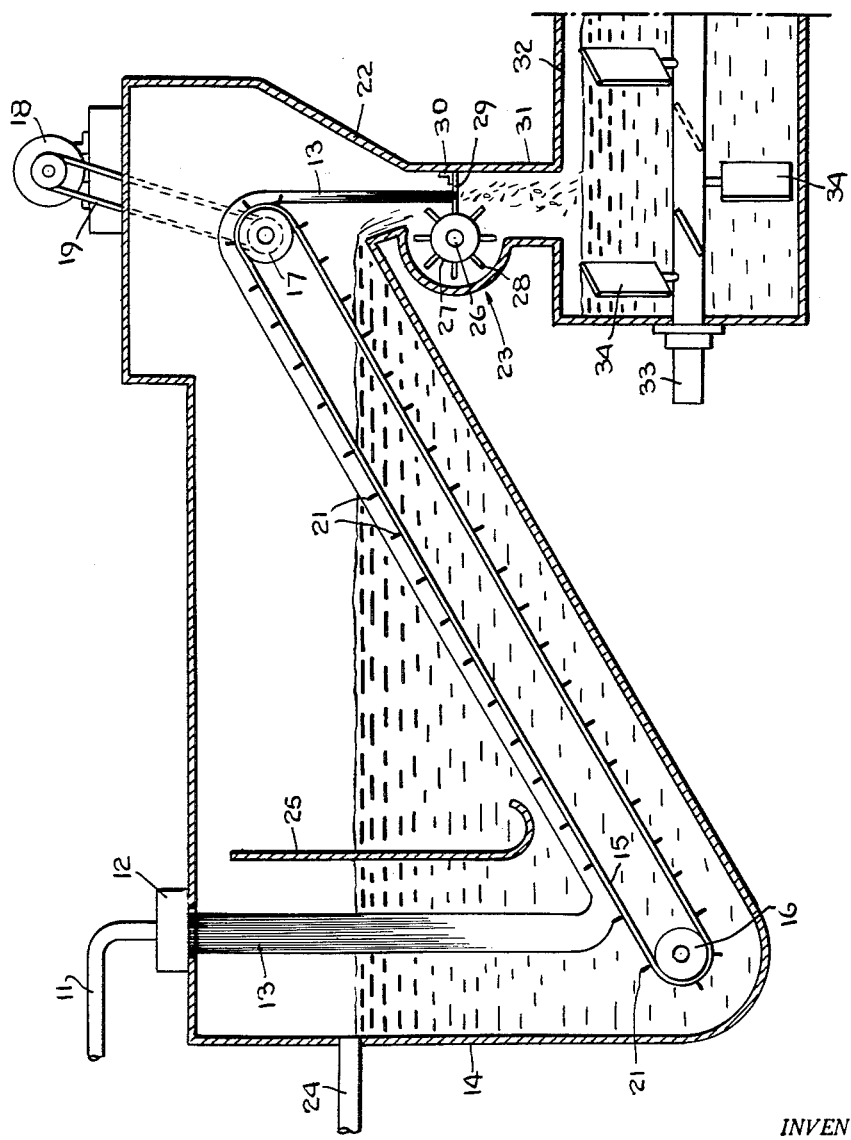
INVENTORS
L. F. GUENTERT
R. F. WILLIAMS
BY H. M. PARSONS
ATTORNEYS

2,939,177
PROCESS OF CUTTING PARTIALLY COAGULATED ESTERS OF CELLULOSE INTO SHORT LENGTHS

Louis F. Guentert, Robert F. Williams, and Harrison M. Parsons, Rock Hill, S.C., assignors to Celanese Corporation of America, New York, N.Y., a corporation of Delaware Filed Feb. 8, 1955, Ser. No. 486,811
8 Claims. (Cl. 18—47.5)

This invention relates to the precipitation of organic acid esters of cellulose and relates more particularly to an improved process and apparatus for the precipitation of organic acid esters of cellulose from the solutions in which they are prepared.

In the production of organic acid esters of cellulose, such as cellulose acetate, by the so-called "solution" process, cellulose is esterified with an organic acid anhydride, such as acetic anhydride, in the presence of a solvent for the ester being formed. After treating the cellulose acetate solution obtained at the completion of the esterification in any desired manner, the cellulose acetate is precipitated therefrom by mixing the said solution with a non-solvent for the cellulose acetate. Finally, the precipitated cellulose acetate is washed to remove therefrom acids and other foreign materials present therein and dried. In order for the washing to be carried out in an efficient manner, it is highly desirable that the precipitated cellulose acetate be free from lamps or the like that will hinder the diffusion of the washing medium into the precipitated cellulose acetate or the diffusion of the acids and other foreign materials from the cellulose acetate. Heretofore, it has been the general practice to carry out the precipitation of cellulose acetate having an acetyl value of less than about 55% by weight, calculated as acetic acid, known as acetone-soluble cellulose acetate, by mixing the solution containing the same with a non-solvent for the cellulose acetate such as water or dilute acetic acid, with stirring, whereby there is obtained a fibrous mass that can be washed with a fair degree of efficiency. When the foregoing process is applied to the precipitation of cellulose acetate or other organic acid esters of cellulose that have fewer than about 0.5 or particularly fewer than about 0.4 free hydroxyl groups per anhydroglucose unit in the cellulose molecule, it is found that the precipitate that is formed is extremely difficult to wash owing to the presence therein of lumps of the cellulose acetate. Attempts to eliminate the formation of such lumps by varying the conditions that prevail during the precipitation, such as the temperature, the concentration of the solutions employed, the degree of stirring, or the like, have not met with any significant success.

It is an important object of this invention to provide a process and apparatus for the precipitation of organic acid esters of cellulose which will be free from the foregoing and other disadvantages.

A further object of this invention is to provide a process and apparatus for the precipitation of organic acid esters of cellulose wherein solutions containing said organic acid esters of cellulose are extruded in the form of continuous filaments into a hardening or coagulating medium and the filaments are then cut into short lengths.

Other objects of this invention will be apparent from the following detailed description and claims.

According to the present invention, organic acid esters of cellulose, such as cellulose acetate, are precipitated from solutions containing the same by extruding the said solutions in the form of continuous filaments into a hardening or coagulating medium wherein the cellulose acetate begins to harden or set. After the filaments have hardened sufficiently, they are cut into short lengths which short lengths are mixed with a hardening medium and the hardening of the cellulose acetate is completed. Then, the short lengths of cellulose acetate are separated from the hardening medium, washed and dried. It is found that the short lengths of cellulose acetate that have been prepared in this manner can be washed with a very high degree of efficiency so that a minimum of time, equipment and wash water is needed to carry out the washing. After washing, the lengths of cellulose acetate dry readily.

The accompanying drawing shows diagrammatically the apparatus of this invention.

The process of this invention is especially well suited for the precipitation of organic acid esters of cellulose, such as cellulose acetate, from the esterification solutions in which such esters have been prepared and wherein they are dissolved in a lower aliphatic acid. It is particularly useful for the precipitation from such solutions of organic acid esters of cellulose that have fewer than about 0.5 and particularly fewer than about 0.4 free hydroxyl groups per anhydroglucose unit in the cellulose molecule since such esters present very considerable problems when they are precipitated by conventional methods. The esterification solutions containing the organic acid esters of cellulose may first be treated in any desired manner to modify the cellulose esters as by stabilizing the same, or increasing their content of free hydroxyl groups to the desired level. The esterification solutions may also be diluted, if desired, with a lower aliphatic acid or other solvent for the organic acid esters of cellulose.

The organic acid of ester of cellulose solutions are then pumped or otherwise extruded through a member containing a plurality of apertures from which the solutions emerge in the form of continuous filaments. The said filaments may then be permitted to fall freely through the air for a short distance, which may range up to about 4 feet, and then enter a body of hardening medium contained in a suitable tank. By varying the distance through which the filaments fall before they enter the hardening medium, it is readily possible to change the final diameter of the filaments and thereby control their washing and hardening characteristics. It is also possible to extrude the filaments directly into the hardening medium. The aperture-containing member should have sufficient space between adjacent apertures to avoid any contact or coalescence of the individual filaments since such coalescence would tend to produce lumps of precipitate that would be extremely difficult to wash. In one particularly desirable arrangement, the apertures are disposed in a series of staggered rows in an elongated rectangular plate and the filaments emerge from said plate to form a warp or sheet of filaments. On entering the hardening medium, the filaments are permitted to fall freely through a sufficient height of the said medium so that their surfaces will be hardened at least to the point where they will not coalesce on simple contact with one another. Thereafter, the mass of filaments is deposited on a supporting member such as a belt which carries the said mass through and then out of the hardening medium and delivers the filaments to a cutter. The filaments are held in the hardening medium for a period of time sufficient to harden them to the point where the pressure exerted on them by the cutting device will not cause their coalescence with one another. However, complete hardening of the filaments at this point is undesirable since it would then be extremely difficult to cut the completely hardened filaments. Moreover, the size of the tank required to complete the hardening of the continuous filaments would be excessive.

Through the use of the belt to move the filaments through and out of the hardening medium, the need for applying tension to the filaments is avoided. Also the use of the belt permits the filaments to be presented to the cutter as a parallel tow whereby the cutting of said filaments takes place with a high degree of efficiency.

The hardening medium is a non-solvent for the organic acid ester of cellulose solution. When the organic acid esters of cellulose are being precipitated from solution in a lower aliphatic acid, which may be acetic acid, formic acid, propionic acid, butyric acid or mixtures of the same, for example, the hardening medium may be water or a dilute aqueous solution of a lower aliphatic acid as specified above containing up to about 50% by weight of the lower aliphatic acid. A sufficient quantity of the hardening medium is brought into contact with the filaments to effect the desired degree of hardening and to avoid a build up of the lower aliphatic acid in said medium to the point where it would tend to dissolve or soften the lower aliphatic acid ester of cellulose. The hardening medium may be maintained at reduced or elevated temperatures or at room temperatures if desired.

The cutting of the continuous filaments into short lengths may be carried out with cutting equipment of any desired type. A particularly valuable form of cutter for cutting the warp of partially hardened continuous filaments into short lengths of uniform size and without causing any coalescence of the same comprises a rotatable supporting member to which are secured outwardly extending cutting bars. The supporting member is rotated at high speed and the impact of the cutting bars against the warp of continuous filaments will effect the cutting of the same. There may also be provided in the cutter a stationary member spaced slightly from the cutting bars, between which stationary member and the cutting bars the continuous filaments will be cut, but the use of this stationary member is not essential.

The short lengths of the organic acid ester of cellulose are then again mixed with a hardening medium wherein their hardening is completed. Advantageously, the same hardening medium is employed both to effect the partial hardening of the continuous filaments and the further hardening of the short lengths. One highly effective way of handling the hardening medium is to enter the same continuously into the tank where the continuous filaments are formed and partially hardened and then to lead the overflow or discharge from the said tank into a vessel where the hardening of the short lengths takes place. The vessel where the hardening of the short lengths takes place is advantageously equipped with paddles, or similar means for moving the short lengths from the inlet to the discharge end thereof.

After the hardening of the short lengths of organic acid ester of cellulose has been completed, the said short lengths are separated from the hardening agent, for example, by means of a screen or a centrifuge. Thereafter, the short lengths are washed with water to remove all foreign materials therefrom and finally dried. The washing of the short lengths goes on with a very high degree of efficiency so that it can be carried to completion rapidly with a minimum of wash water, time and equipment. The washed short lengths dry rapidly.

Referring now to the drawing wherein the apparatus of this invention is shown, the reference numeral 11 designates a conduit through which the organic acid ester of cellulose solution is pumped to an elongated member 12 provided with a plurality of rows of apertures. The organic acid ester of cellulose solution emerges from the member 12 in the form of a warp of filaments 13 that falls through the air for a short distance into a bath of hardening medium contained in a tank 14. The warp of filaments 12 falls freely through the hardening medium and then drops onto an endless belt 15 that is trained around rolls 16 and 17. The belt 15 is inclined at an angle with its lower end immersed in the hardening medium in the tank 14 and its upper end above said hardening medium, and the said belt carries the warp of filaments 13 through and out of the hardening medium. To move the belt 15, there is provided a drive mechanism 18 that is linked to the roll 17 by means of a drive belt 19 that causes the roll 17 to rotate in a clockwise direction.

The warp of filaments 13 is quite slippery in its partially hardened state and would tend to slide down the belt 15. To avoid any such sliding, the belt 15 is provided with a series of upstanding members 21 that engage the warp of filaments 13 and prevent them from moving relative to the belt 15. After being carried over the roll 17 by the belt 15, the warp of filaments 13 drops into a discharge hopper 22 leading to a cutter, indicated generally by reference numeral 23.

A stream of hardening medium is entered continuously into the tank 14, at a point adjacent the entry into said tank of the warp of filaments 13, through a conduit 24 and overflows from said tank through the discharge hopper 22. The fresh hardening medium is confined to the vicinity of the newly formed warp of filaments 13 by means of a baffle 25 that is spaced a short distance from the said warp of filaments and extends downwardly through the hardening medium to a point just clear of the belt 15 so that the maximum hardening effect will be achieved on the newly formed filaments. As shown in the drawing, the floor of the tank 14 is inclined upwardly and extends parallel to and is spaced a short distance from the belt 15. By means of this construction, the volume of hardening medium in the tank 14 is held at a minimum while providing for an adequate volume of such medium properly to treat the warp of filaments 13.

The cutter 23 comprises a shaft 26 which is rotated at a high speed by any suitable means (not shown) and which carries a roll 27 from the periphery of which there extend radially outwardly a plurality of elongated cutter bars 28. Cooperating with the cutter bars 28 is a stationary cutter bar 29 that is supported on a bracket 30 and extends almost into contact with the cutter bars 28. The warp of filaments 13 enters the cutter 23 and the continuous filaments are severed by said cutter into short lengths. It should be understood that the stationary cutter bar 29 is not essential and may be omitted from the cutter 23 in which case the continuous filaments will be cut into short lengths simply through the impact on said filaments of the rapidly rotating cutter bars 28.

The short lengths produced by the cutter 23 drop through a chute 31 into a vessel 32 wherein the further hardening of said short lengths takes place. The hardening medium that has overflowed from the tank 14 into the discharge hopper 22 drops through the chute 31 into the vessel 32 to carry out the further hardening of the said short lengths of organic acid ester of cellulose. The vessel 32 has a rotatable shaft 33 driven by any suitable means (not shown) extending longitudinally thereof. Secured to the shaft 33 are a plurality of paddles 34 that are inclined at an angle and will move the short lengths along the length of the tank 32.

The process of this invention will now be described specifically in connection with the precipitation from solution of cellulose acetate. It should be understood, however, that it is also applicable to the precipitation from solution of other organic acid esters of cellulose including, for example, cellulose propionate, cellulose butyrate, cellulose acetate formate, cellulose acetate propionate and cellulose acetate butyrate.

The following example is given to illustrate this invention further.

*Example*

An esterification solution containing cellulose acetate having an acetyl value of 60% by weight, calculated as acetic acid, dissolved in acetic acid is pumped into the apparatus shown in the accompanying drawing and converted therein into a warp of continuous filaments. After falling through the air for one foot, the continuous filaments drop into a bath of hardening medium four feet deep and comprising aqueous acetic acid having an initial acetic acid concentration of 12 to 15% by weight. After falling through the acetic acid, the continuous filaments are carried through and out of the hardening medium by the movement of the endless belt. The continuous filaments are then cut into short lengths having a uniform size of one inch by means of the cutter which has an outside diameter of 12 inches and rotates at 1500 r.p.m. Thereafter, the short lengths and the overflow of hardening medium drop into the hardening vessel wherein the hardening of the short lengths is completed. The short lengths are then separated from the hardening medium and washed with a countercurrent stream of water. Washing takes place rapidly and with a high degree of efficiency so that the short lengths are rapidly brought to an acid-free state with a minimum of wash water. The short lengths of cellulose acetate are then dried.

It is to be understood that the foregoing detailed description is merely given by way of illustration and that many variations may be made therein without departing from the spirit of our invention.

Having described our invention, what we desire to secure by Letters Patent is:

1. Process for the precipitation of organic acid esters of cellulose from solution, which comprises extruding the said solution to form continuous filaments, partially coagulating the said continuous filaments in a liquid coagulating medium, cutting the continuous filaments into short lengths, and further coagulating the short lengths in a liquid coagulating medium containing the same compounds as said first-named coagulating medium.

2. Process for the precipitation of cellulose acetate containing fewer than about 0.5 free hydroxyl groups per anhydroglucose unit in the cellulose molecule from solution, which comprises extruding the said solution to form continuous filaments, partially coagulating the said continuous filaments in a liquid coagulating medium, cutting the continuous filaments into short lengths, and further coagulating the short lengths in a liquid coagulating medium containing the same compounds as said first-named coagulating medium.

3. Process for the precipitation of organic acid esters of cellulose from solution, which comprises extruding the said solution into a liquid coagulating medium to form continuous filaments, permitting said continuous filaments to fall freely through the coagulating medium until the surfaces of said filaments are coagulated sufficiently so that said filaments will not coalesce on simple contact with one another but are not completely coagulated, depositing the continuous filaments on a supporting member, moving said supporting member to carry said continuous filaments through and out of the coagulating medium, cutting said continuous filaments into short lengths, mixing the short lengths with a liquid coagulating medium containing the same compounds as said first-named coagulating medium, and further coagulating the short lengths in said latter coagulating medium.

4. Process for the precipitation of organic acid esters of cellulose from solution in a lower aliphatic acid, which comprises extruding the said solution into a coagulating medium selected from the group consisting of water and dilute aqueous solutions of a lower aliphatic acid to form continuous filaments, partially coagulating the said continuous filaments in said coagulating medium, cutting said partially coagulated continuous filaments into short lengths, and further coagulating the short lengths in a liquid coagulating medium containing the same compounds as said first-named coagulating medium.

5. Process for the precipitation of cellulose acetate from solution in a lower aliphatic acid, which comprises extruding the said solution into a coagulating medium selected from the group consisting of water and dilute aqueous solutions of a lower aliphatic acid to form continuous filaments, partially coagulating the said continuous filaments in said coagulating medium, cutting said partially coagulated continuous filaments into short lengths, and further coagulating the short lengths in a liquid coagulating medium containing the same compounds as said first-named coagulating medium.

6. Process for the precipitation of organic esters of cellulose from solution which comprises extruding the said solution to form continuous filaments, partially coagulating the said continuous filaments in dilute aqueous acetic acid, cutting the continuous filaments into short lengths, and further coagulating the short lengths in dilute aqueous acetic acid.

7. Process for the precipitation from solution in acetic acid of cellulose acetate containing fewer than about 0.5 free hydroxyl groups per anhydroglucose unit in the cellulose molecule, which comprises extruding said solution into a coagulating medium selected from the group consisting of water and dilute aqueous acetic acid to form continuous filaments, permitting the continuous filaments to fall freely through the coagulating medium until the surfaces of said filaments are coagulated sufficiently so that said filaments will not coalesce on simple contact with one another but are not completely coagulated, depositing the continuous filaments on a supporting member, moving said supporting member to carry said continuous filaments through and out of the coagulating medium, cutting said continuous filaments into short lengths, mixing the short lengths with a coagulating medium selected from the group consisting of water and dilute aqueous acetic acid, and completing the coagulating of the short lengths in said coagulating medium.

8. Process for the precipitation from solution in acetic acid of cellulose acetate containing fewer than about 0.5 free hydroxyl groups per anhydroglucose unit in the cellulose molecule, which comprises extruding said solution into the air to form filaments, entering said filaments into a coagulating medium selected from the group consisting of water and dilute aqueous acetic acid, permitting the continuous filaments to fall freely through the coagulating medium until the surfaces of said filaments are coagulated sufficiently so that said filaments will not coalesce on simple contact with one another but are not completely coagulated, depositing the continuous filaments on a supporting member, moving said supporting member to carry said continuous filaments through and out of the coagulating medium, cutting said continuous filaments into short lengths, mixing the short lengths with a coagulating medium selected from the group consisting of water and dilute aqueous acetic acid, and completing the coagulating of the short lengths in said coagulating medium.

References Cited in the file of this patent

UNITED STATES PATENTS

| | | |
|---|---|---|
| 467,041 | Morris | Jan. 12, 1892 |
| 1,764,202 | Dreyfus | June 17, 1930 |
| 1,958,238 | Dreyfus et al. | May 8, 1934 |
| 2,086,590 | Whitehead | July 13, 1937 |
| 2,134,160 | Kohorn | Oct. 25, 1938 |
| 2,143,252 | Zu Kornegg | Jan. 10, 1939 |
| 2,290,929 | Whitehead | July 28, 1942 |
| 2,319,305 | Nooij | May 18, 1943 |
| 2,367,493 | Fordyce | Jan. 16, 1945 |
| 2,464,746 | Gering | Mar. 15, 1949 |
| 2,515,889 | Nicoll | July 18, 1950 |
| 2,627,084 | Ryan | Feb. 3, 1953 |
| 2,657,973 | Johnson | Nov. 3, 1953 |
| 2,697,247 | Bettes | Dec. 21, 1954 |
| 2,755,509 | Smidth | July 24, 1956 |

FOREIGN PATENTS

| | | |
|---|---|---|
| 515,861 | Canada | Aug. 23, 1955 |